(12) United States Patent
Potter et al.

(10) Patent No.: US 6,404,075 B1
(45) Date of Patent: Jun. 11, 2002

(54) UNINTERRUPTIBLE POWER GENERATION SYSTEM

(75) Inventors: David S. Potter, Oakland; Eduardo A. Alegria, San Mateo, both of CA (US)

(73) Assignee: Chevron Energy Solutions, L.P., San Francisco, CA (US)

( * ) Notice: Subject to any disclaimer, the term of this patent is extended or adjusted under 35 U.S.C. 154(b) by 0 days.

(21) Appl. No.: 09/484,669

(22) Filed: Jan. 18, 2000

(51) Int. Cl.[7] .................................................. H02J 7/00
(52) U.S. Cl. .......................................... 307/64; 307/87
(58) Field of Search ............................... 307/64–68, 87

(56) References Cited

U.S. PATENT DOCUMENTS

| | | | | |
|---|---|---|---|---|
| 4,315,163 A | * | 2/1982 | Bienville | 307/66 |
| 5,210,685 A | * | 5/1993 | Rosa | 363/109 |
| 5,814,904 A | * | 9/1998 | Galm | 307/130 |

* cited by examiner

*Primary Examiner*—Josie Ballato
*Assistant Examiner*—Sharon Polk
(74) *Attorney, Agent, or Firm*—Richard J. Schulte (57) ABSTRACT

A power delivery system including a primary power bus for transferring power to the facility from on-site generators, and a secondary power bus for transferring power to the facility from a utility. The system further includes a static disconnect switch capable of quickly isolating the facility from the utility power grid, and a controller for controlling the overall operation of the power delivery system. In a normal mode of operation, the utility supplies power approximately in the amount of the single largest load in the facility, with the remaining power being supplied by the on-site generators. If one or more of the generators go off-line, the power supply from the utility may be increased. Similarly, if the quality of the power supplied by the utility drops below a predetermined level, the static disconnect switch quickly opens and islands the facility, whereupon 100% of the power is supplied by the generators.

38 Claims, 8 Drawing Sheets

FIG. 1

PRIOR ART

*FIG. 2*

*PRIOR ART*

FIG. 3

PRIOR ART

UNINTERRUPTIBLE POWER GENERATION SYSTEM

BACKGROUND OF THE INVENTION

1. Field of the Invention

The present invention relates to a large scale power supply system, and in particular to an uninterruptible power supply system providing high quality power through a system including a primary on-site power supply, secondary utility power supply and a rapid switching response to island the facility in the event of utility power quality disruptions.

2. Description of the Related Art

Primary power supply for facility operation and home usage is conventionally provided by government regulated power utilities, such as for example PG&E in northern and central California. It is a goal of utilities to provide low cost, high quality power to service subscribers' energy needs. High quality power is power that is continuously available at a relatively constant voltage and frequency. Most homes and some small facilities rely solely on utilities for their power needs. However, it is more common, at least in facilities, to employ some sort of emergency backup power generation system in the event the voltage and/or frequency of the utility supplied power fluctuates outside of acceptable ranges, or fails entirely. Emergency backup systems in general minimize health and safety risks to facility personnel and occupants, and ensure continued satisfactory operation of the facility when power supply from the utility is inadequate or fails. Moreover, certain facilities require an uninterrupted supply of power to prevent damage to facility systems and/or the loss of critical data. Such facilities include semiconductor wafer fabs, automated manufacturing plants and those employing data processing systems. Uninterrupted power supplies are also often necessary in a wide variety of facility control systems. Power failure to such facility systems for even a second or two can be extremely disruptive, damaging and dangerous.

There are several conventional emergency backup power supply schemes. A first such system, shown in FIG. 1, employs a battery 10 (or battery bank), a battery rectifier/charger 12 and an emergency AC bus 14. The rectifier/charger 12 is provided for converting the current to the battery from AC to DC and for charging the battery. An inverter 11 is also provided for converting the current leaving the battery from DC back to AC. If power from the utility 16 is inadequate or fails entirely, a control system 18 switches the power feed to the battery. This type of system has the advantage that the power supply may be switched over from the utility to the battery in less than a cycle. However, such systems can only supply power for short periods of time, and are not practical for long term uninterrupted power supply (e.g., more than a few minutes). Moreover, these systems themselves consume a relatively large amount of power and are extremely expensive to operate in megawatt power applications.

Figure 2:
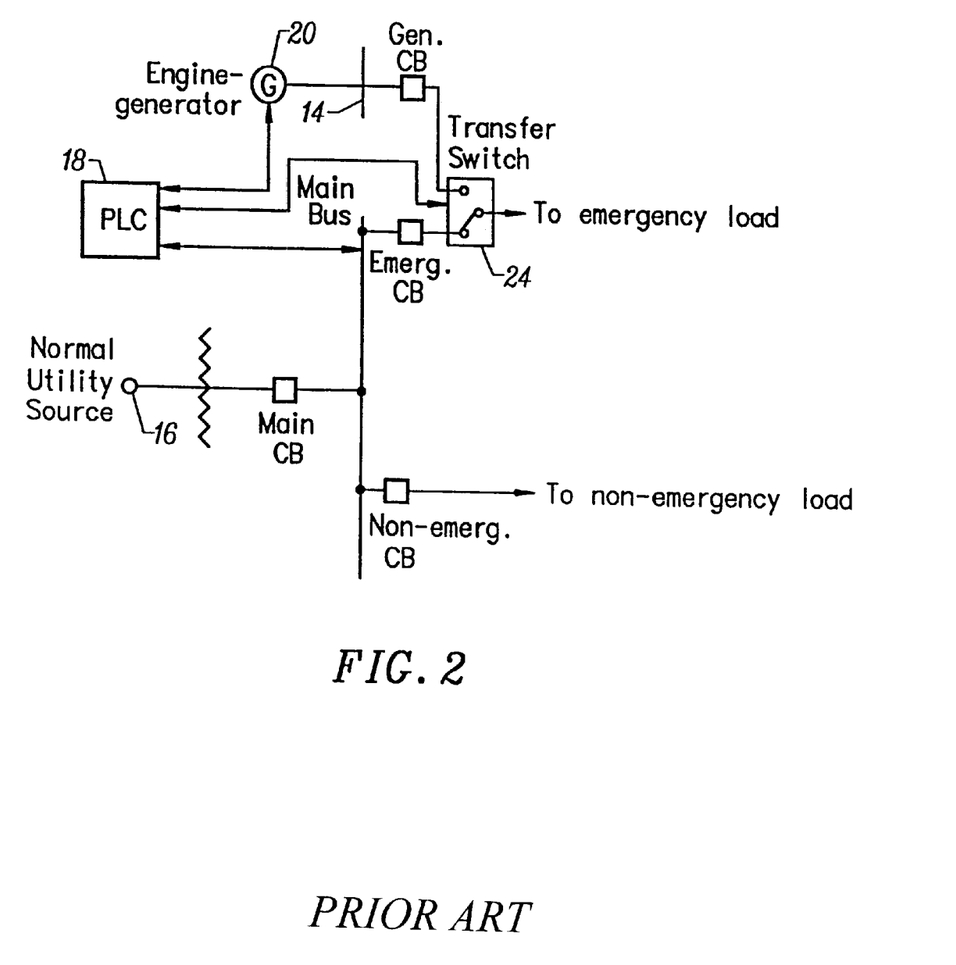
FIG. 2 is a prior art schematic representation showing an emergency backup power supply system including a primary feed from a utility and a secondary feed from a generator.

Another emergency backup power supply system, shown in FIG. 2, employs a generator 20. The generator includes a motor which burns a working fluid, such as gasoline, natural gas or diesel oil, to produce a mechanical output force. This mechanical output force is then used to rotate conductive coils in the presence of a stationary magnetic field, or visa-versa, to create electrical energy in the windings. If power from the utility 16 is inadequate or fails entirely, the engine runs the generator 20 to produce power, and when the voltage and frequency of the output power reaches acceptable levels, a control system 18 activates a transfer switch 24 to supply the load from the generator. While such systems may run for long periods of time, a significant drawback to backup generators is that they take several seconds until the power can properly supply the load. As such, use of a generator as a backup power system is not feasible for facilities requiring uninterruptible power supply.

Figure 1:
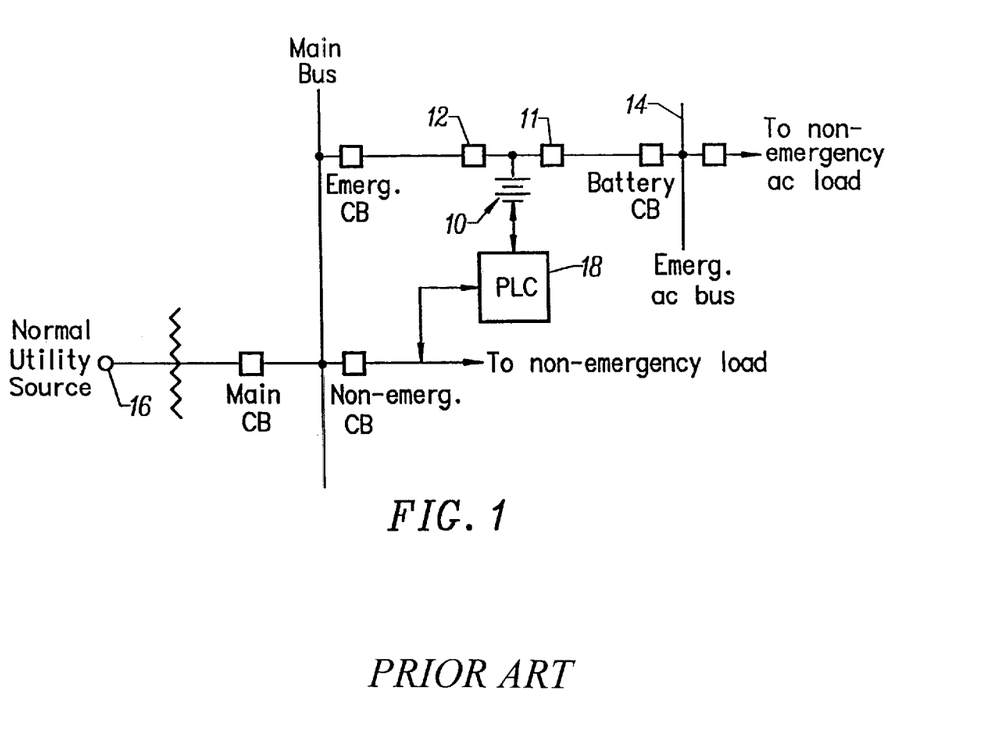
FIG. 1 is a prior art schematic representation showing an emergency backup power supply system including a primary feed from a utility and a secondary feed from a battery.

Perhaps the most common emergency backup power supply system for uninterruptible power applications is a combination of the systems of FIGS. 1 and 2 to provide an uninterruptible power supply. In particular, upon the voltage or frequency of the utility power supply fluctuating outside of acceptable levels, power is switched to a temporary power supply such as the battery system. The battery system supplies the load until the output from the backup generator is at acceptable levels, at which point the power supply is switched over to the generator. Instead of the battery system, it is also known to have a temporary power supply in the form of a continuously running motor fed by the utility and including a flywheel with a high moment of inertia. If the utility power falls or falls below acceptable levels, the facility load is switched to the motor, which supplies power from the kinetic energy stored in the motor. As the kinetic energy is dissipated, the backup generator is brought on-line, and once the power output from the backup generator is at acceptable levels, the power supply is switched over to the generator. Each of these combination systems requires implementation, maintenance and control of additional systems. Moreover emergency backup systems employing short term supplies (such as the above-described battery and flywheel) are expensive to operate. The short term supply system can often cost approximately two-thirds of the overall cost of the power supply system.

Figure 3:
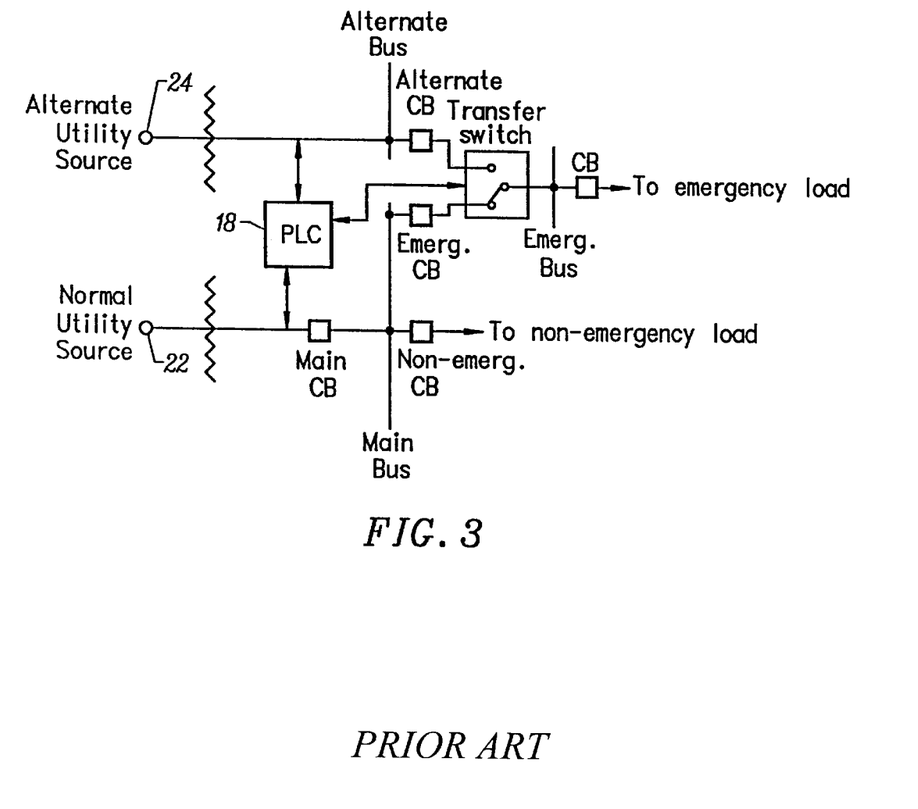
FIG. 3 is a prior art schematic representation showing an emergency backup power supply system including two feeds from a utility.

It is also known, as shown in FIG. 3, to have a primary feed 22 and secondary feed 24 to the power utilities. While this is satisfactory for uninterrupted power supply, a second connection to a power utility is expensive to implement and maintain. Moreover, a second connection is often unavailable.

A common feature in known power supply systems is that the primary facility load is supplied by the utility. Moreover, such power supply systems employing emergency backup power supply for megawatt applications conventionally include short term power supply components, which as indicated above are expensive to maintain. There is at present a need for an alternative power supply system capable of supplying low cost, high quality power on demand to facilities which require an uninterruptible power supply.

SUMMARY OF THE INVENTION

It is therefore an advantage of the present invention to provide a novel uninterruptible power supply system.

It is another advantage of the present invention to provide low cost, high quality power for megawatt applications.

It is a further advantage of the present invention to provide an uninterruptible power supply that includes no short term power supply, together with an attendant reduction in cost.

It is a further advantage of the present invention that the primary source of facility power supply is located on-site.

It is another advantage to provide a high level of power quality in part through a rapid switching response to island the facility in the event a power quality event degrades the power received from the utility.

It is a still further advantage of the present invention to provide significant cogeneration opportunities for servicing other facility needs.

It is another advantage of the present invention is to allow the power supply to be controlled by the facility instead of the utility.

It is a still further advantage of the present invention that conventional power delivery systems may be easily converted to operate in accordance with the principals of the present invention.

These and other advantages are provided by the present invention which in preferred embodiments relates to a power delivery system including a primary power bus for transferring power to the facility from on-site generators, and a secondary power bus for transferring power to the facility from a utility. The system further includes a static disconnect switch capable of quickly isolating, or "islanding", the facility from the utility power grid, and a controller for controlling the overall operation of the power delivery system.

The utility preferably provides a small, constant power flow to supplement the primary generator power supply in a normal mode of operation. In setting the precise relative contributions of the on-site generators and utility in a normal mode of operation, the utility power supply should be low enough that the generators can handle the facility islanding at any time upon a drop in power quality from the utility. At the same time however, the utility power supply should be high enough to prevent frequent tripping of the reverse power relay (at least in the United States) and to prevent acceleration of the generators upon a drop in facility load.

In a normal mode of operation, these factors are balanced by the utility supplying power approximately in the amount of the single largest load in the facility, with the remaining power being supplied by the on-site generators. Setting the power draw from the utility less than this presents the risk that power will attempt to flow into the utility power grid in the event that high-load facility component goes off-line. Setting the power draw from the utility much higher than this presents the risk that the generators will be unable handle the initial load upon a drop in power from the utility and islanding of the facility.

If a generator goes off-line, the additional power may come from the other generators, in the event a redundant generator system is employed, or the additional power may come from the utility. In the event a redundant generator system is used, the controller controls the operation of the generators to make up the power from the off-line generator. Where there are no redundant generators, or during the time that the redundant generator or generators are brought on-line, additional power is automatically drawn from the utility to supply the load without separate protocols in the controller. In the unlikely event that each of the generators goes off-line, 100% of the facility load may be supplied by the utility.

Should there be a drop in the quality of power from the utility, this event is detected by sensors in communication with the static disconnect switch controller, and the switch opens in less than a cycle to thereby island the facility from the utility power grid so that 100% of the facility load is supplied by the on-site generators. This protects the facility against utility power quality disruptions and the rapid switch over allows the power supply system according to the present invention to continuously provide a high level of power quality to the facility.

BRIEF DESCRIPTION OF THE DRAWINGS

The present invention will now be described with reference to the drawings in which.

DETAILED DESCRIPTION

The present invention will now be described with reference to FIGS. 4–8 which in general relate to a low cost, high quality, uninterruptible power delivery system employing parallel operation of an on-site primary power supply and an emergency backup power supply from a power utility. Referring specifically to the graphic representation shown in FIG. 4, a facility 100 receives power from a power delivery system 102 according to the present invention, which includes a primary power bus 103 for transferring power to the facility from on-site generators 104, and a secondary power bus 106 for transferring power to the facility from a utility or power grid 108. The system further includes a static disconnect switch 110 capable of quickly isolating the facility 100 from the utility power grid (a condition known as islanding) and a controller 112 for controlling the overall operation of power delivery system 102. In a preferred embodiment of the present invention, power delivery system 102 supplies high power loads of approximately one or more megawatts.

Figure 4:
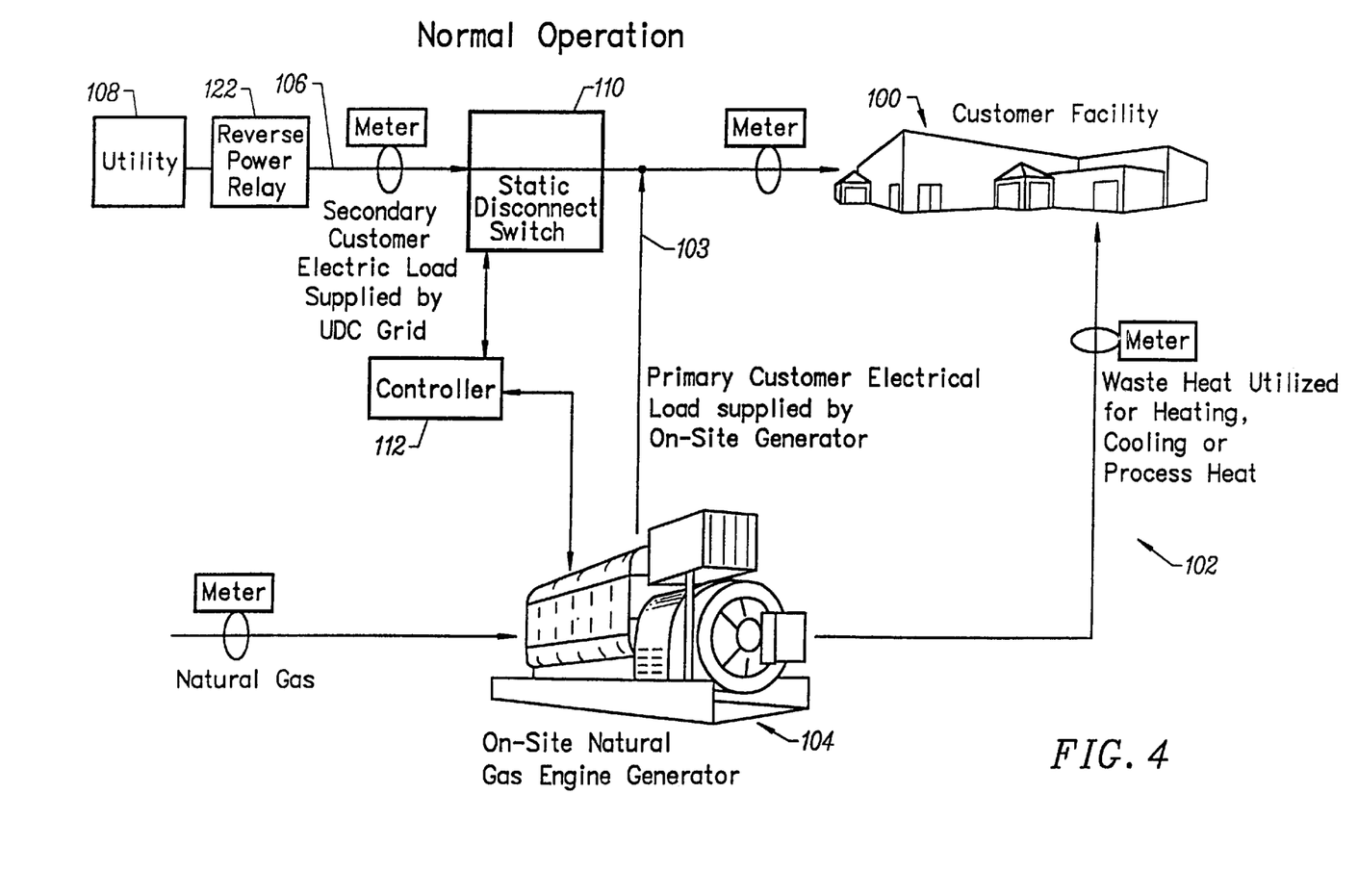
FIG. 4 is a graphic representation of the power delivery system according to the present invention operating in a normal mode of operation.

During normal operation of the system, the facility power load is serviced primarily from the on-site generators 104 which are run continuously. The remaining facility load is supplied by power from the utility. The factors which determine the relative contribution from the on-site generators 104 and utility 108 in a normal mode of operation will be explained hereinafter.

Figure 5:
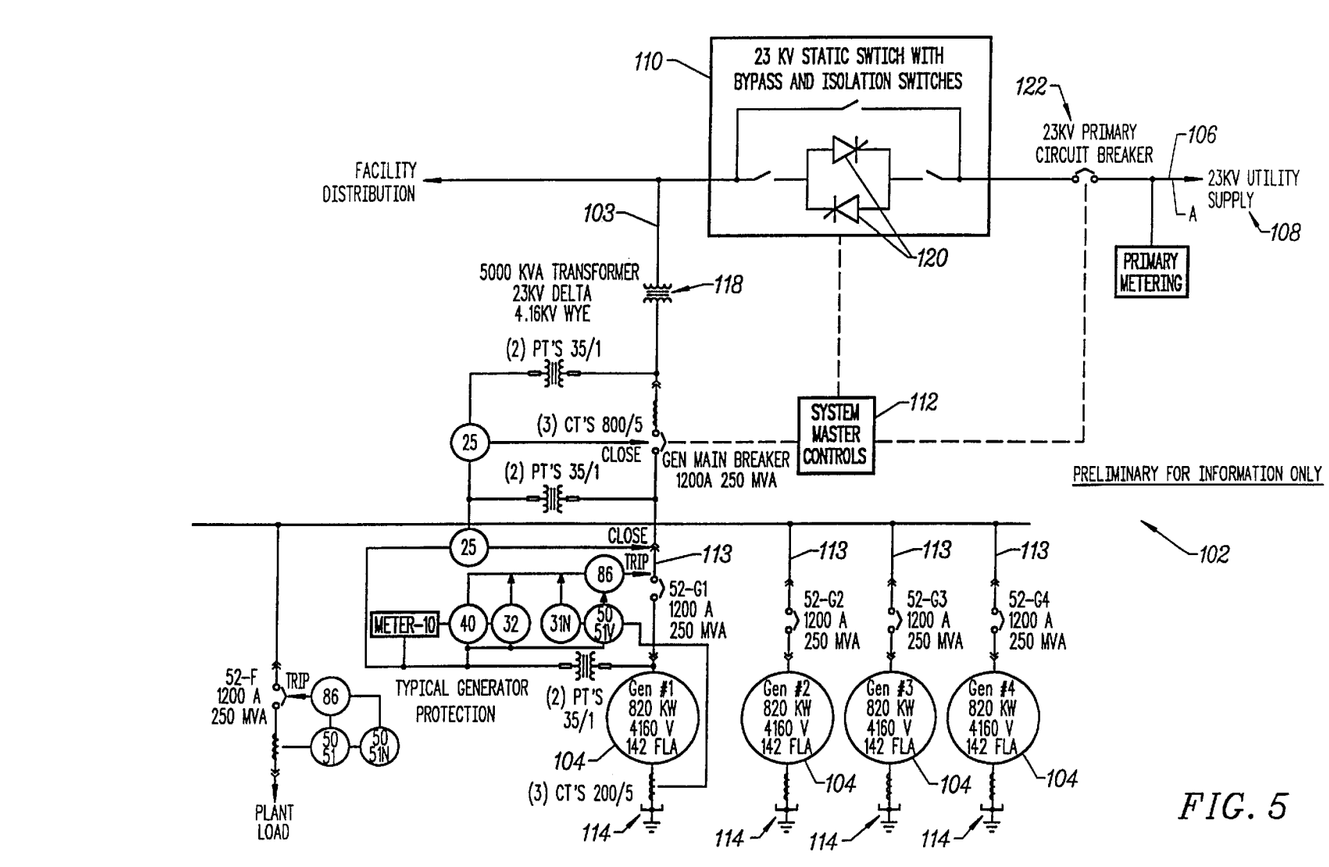
FIG. 5 is a schematic representation of the power delivery system shown in FIG. 4.

The generators 104 for use with the present invention are high efficiency generators of known construction, and may be for example those produced by Caterpillar, Inc., 100 N.E. Adams, Peoria Ill. 61629 under Model No. G3516 which run on natural gas and are rated at 820 KW at 60 Hz. It is understood that a wide variety of other generators may be used in accordance with the present invention as the primary power supply for system 102. For example, it is contemplated that on-site diesel or gasoline generators or on-site gas turbines may used in alternative embodiments. The power may alternatively be supplied by fuel cells. It is further contemplated that a generator bank employing different types of generators be used. The number and type of generators 104 used in a given power delivery system 102 will depend on the size of the facility receiving power from the system 102, as well as the location of the facility and the availability of the various generator fuels. It is also contemplated that redundant generators 104 be used so that, in the event of maintenance or failure of one or more of the primary generators, the spare generators may be brought on-line. As shown in FIG. 5, conventional generator protection protocols may be employed for preventing electrical faults, power surges and other conditions from damaging the generators. Such generator protection protocols include for example circuit breakers 113, grounding reactors 114, over-current and over-voltage relays and directional/power relays.

Generators 104 preferably output power at the frequency rating of the facility, for example 60 Hz in the United States. The voltage output from generators 104 may match that received on secondary bus 106 from the utility. Alternatively, one or more transformers 118 may be employed for stepping up and/or down the voltage to match that of the voltage received on secondary bus 106 from the utility. A transformer 118 may additionally or alternatively be provided on secondary bus 106 for changing the voltage from the utility 108.

Automatic electromechanical disconnect switches generally take on the order of between 4 to 20 cycles to transfer power supply. While this is acceptable for most facilities, it is not acceptable for those which require an uninterruptible power supply. In particular, it is a problem with conventional switches used in high power applications that upon a grid related event such as an electrical short, voltage in the grid drops drastically. As conventional electromechanical switches are slow to respond, the electrical short in the grid will drastically reduce the facility voltage. In this event, the kinetic energy from the engines driving the generators will exceed the power being drawn from the generators by the facility load, and the generators will accelerate. This acceleration will increase the frequency of the power from the generators and may cause the generators to shut down. Thus, when the conventional switch finally opens, it is too late because the generators have already accelerated owing to the drop in the facility voltage.

This problem is solved in the present invention by use of the static disconnect switch 110 for quick islanding of the facility. In the event of a grid related event such as a short, the switch opens in less than a cycle. Thus, there is no power mismatch in the generators and they remain in step with the facility load. This rapid switching response in part accounts for the high level of power quality provided by the present invention in that the facility is protected against utility power quality disruptions.

Static disconnect switch 110 is a solid state switch of known construction, and is capable of switching in one-quarter cycle or less from normal operation to an operational mode where the facility load is supplied completely from generators 104. A static disconnect switch 110 of a type for use with the present invention is manufactured for example by Inverpower Controls Ltd., 835 Harrington Court, Burlington, Ontario, Canada L7N-3P3, and includes a number of thyristors and/or transistors 120 for controlling current flow through the switch, and a static disconnect controller (not shown) which preferably operates independently of the overall controller 112 to open and close the switch. It is understood that other switches exhibiting similar, sub-cycle response times may be used instead of the static disconnect switch in alternative embodiments.

In a normal mode of operation, the static disconnect switch 110 is closed and the facility load is supplied from both the on-site generators 104 and the utility 108, with the generators supplying the primary load. Several factors determine the precise relative contribution between the on-site generators and utility when operating in a normal mode. One factor is that in the United States, only certain facilities are qualified to send power from the facility into the power grid, i.e. in the direction of arrow A on bus 106 in FIG. 5. If the generators provided 100% of the load, upon a sudden decrease in the facility load (as where a facility power-consuming component goes off-line), the generators would initially be producing excess power before they adjusted to the change in load. This excess power would flow back into the grid. Where a facility is not qualified to send power to the grid, the facility includes a reverse power relay 122 on bus 106, which relay trips in the event the power supply system 102 attempts to supply power to the grid. When the reverse power relay 122 trips, this islands the facility so that 100% of the facility load is supplied by the generators. When islanding, the facility load is fully supplied by the generators, but has no backup power supply from the utility.

Moreover, upon a sudden decrease in the facility load, in addition to islanding, the electromotive power from the engines driving the generators will exceed the power being drawn from the generators by the facility load, which condition results in acceleration of the generators. This acceleration can increase the frequency of the power from the generators which may result in a shut-down of the generators.

Additionally, if the power contribution from the utility is set too low, then normal power fluctuations in the facility can cause excess power from the generators to flow back to the grid, resulting in frequent tripping of the reverse power relay and islanding of the facility.

Figure 6:
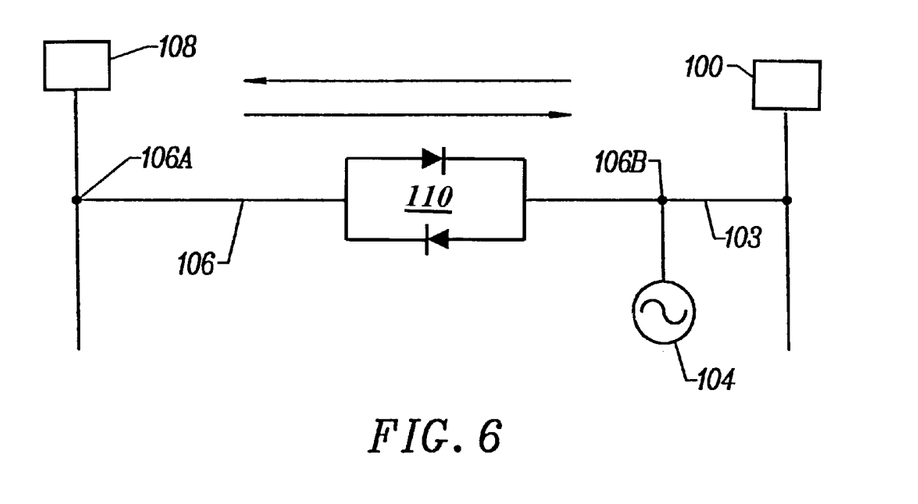
FIG. 6 is a schematic representation of a portion of the power delivery system shown in FIG. 4.

Even in situations where power is allowed to flow back to the grid, there are advantages to having at least a small, constant power flow from the utility. Referring to FIG. 6, if the generators provide 100% of the power so that the power output from the generators matches the power load of the facility, the voltage potential between nodes 106A and 106B on the secondary bus 106 will be zero with no current flow. However, in reality, the facility load will fluctuate upwards and downwards slightly and the power output from the generators will slightly trail the facility load. This slight difference between the power generated in generators 104 and the facility load will result in power oscillations over bus 106 as indicated by the arrows in FIG. 6, as excess power from generators 104 flows to the grid in one instant and additional power from the utility is drawn from the grid in the next. This current flow oscillation can create noise and other disadvantageous consequences.

On the other hand, if the utility is supplying too much of the facility load in a normal mode of operation, then when the utility goes off-line, the initial change in power draw on generators may be too great causing the generator to decelerate and the relays provided to protect the generators may trip and power from the generators shut down.

Therefore, in setting the relative contributions of the on-site generators and utility in a normal mode of operation, a balance is struck. The utility power supply should be low enough that the generators can handle the facility islanding at any time upon a drop in power quality from the utility. At the same time however, the utility power supply should be high enough to prevent frequent tripping of the reverse power relay and to prevent acceleration and potential shut-down of the generators upon a decrease in the facility load.

In a normal mode of operation, this balance is struck both in the United States and abroad by the utility supplying power approximately in the amount of the single largest load in the facility, with the remaining power being supplied by the on-site generators. If the power from the utility is so small as to be lower than individual facility component loads, then, should one of those components go off-line, the facility load would be less than the output of the generators and power would attempt to flow into the grid. As discussed above, this can result in tripping of the reverse power relays and/or acceleration of the generators to a point where they shut down. Therefore, the utility preferably provides an amount of power equal to or slightly greater than the single largest load in the facility. In that way, if that facility load goes off-line, there is still some power being drawn from the utility.

As an example and in no way limiting on the present invention, the generators may supply from 80% to 98% of the facility load, with the utility supplying the rest. It is understood however that the amount of power supplied respectively by the generators and utility may vary outside of these percentages in alternative embodiments. Additionally, it is understood that factors other than those described above may be relevant in determining the relative power contribution between the generators and utility in a normal mode of operation.

While the utility provides a small constant flow of power in a preferred embodiment for the above-explained reasons, it is alternatively contemplated that the on-site generators provide 100% of the load with the utility being available as a backup in the event the power needs of facility are greater than the amount of power provided by the on-site generators. (The facility load may exceed the generator output if one or more of the generators go off-line. This may also occur upon a sudden increase in facility load, in which case the utility will supply the excess load until the generators adjust to the facility power increase).

One role of the controller 112 is to continuously monitor the facility load and adjust the power generated by the on-site generators 104 accordingly. If the facility load drops, the controller 112 decreases power output from the generators. In the event that the facility load drops significantly, as discussed above, the generators will initially be supplying excess power that will have nowhere to go, and will attempt to flow into the grid. There is a built in time delay in the reverse power relay 122 of a few seconds. It is a goal of the controller 112 to reduce the power output from the generators to match the reduced facility load before the reverse power relay trips and islands the facility. On the other hand, if the facility load increases, the controller 112 increases the power output from the generators. In this regard, the utility acts as a buffer to supply any additional power necessary while the generators are increasing the power output.

Up to this point, the power supply between the generators 104 and utility 108 to service the facility load has been described under normal operating conditions, i.e., both the generators and utility are supplying high quality power within acceptable voltage and frequency ranges. However, it may happen that either the generators or utility may experience problems. In such an event, it is a feature of the present invention that the power output of the properly functioning power supply can increase its power output to maintain the supply of high quality power to the facility.

Figure 7:
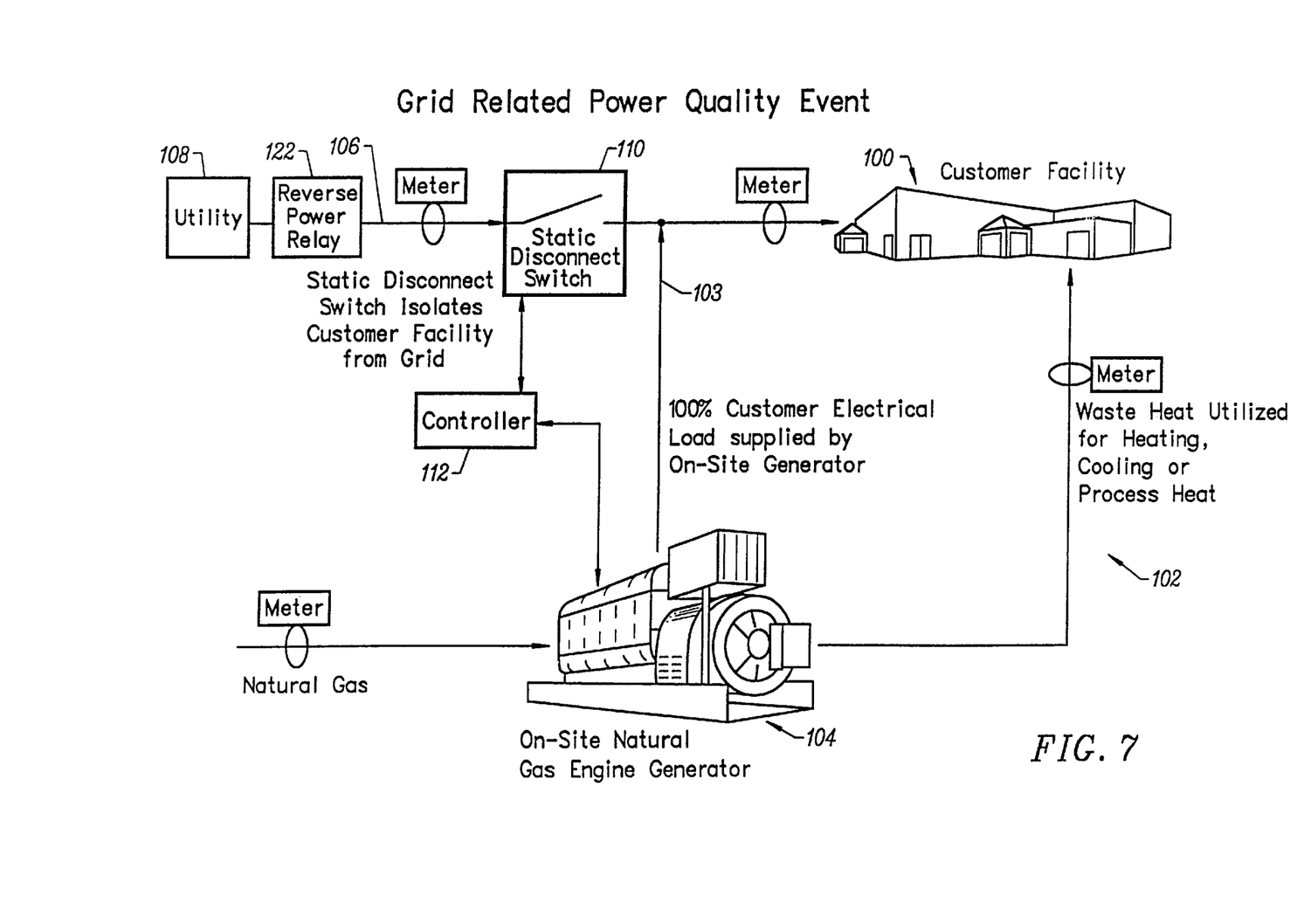
FIG. 7 is a graphic representation of the power delivery system according to the present invention operating under a utility power grid event.

For example, if a generator 104 goes off-line, the additional power may come from the other generators, in the event a redundant generator system is employed, or the additional power may come from the utility. In the event a redundant generator system is used, the controller 112 controls the operation of the generators to make up the power from the off-line generator. Where there are no redundant generators, or during the time that the redundant generator or generators are brought on-line, additional power is automatically drawn from the utility to supply the load without separate protocols in the controller. In the unlikely event that each of the generators 104 goes off-line, 100% of the facility load may be supplied by the utility 108.

Where one or more of the generators are down or where the generator bank is otherwise unable to supply the facility load, the controller 112 preferably disables the static disconnect switch 110 to prevent the facility from islanding. In this event, if the quality of the power on the grid side also degrades, the facility will receive the degraded utility power, as opposed to no power at all.

Where the generators 104 are functioning properly, should a grid related power quality event occur, this event is detected by sensors in communication with the static disconnect switch controller, and the switch 110 opens in less than a cycle to thereby island the facility from the utility power grid. This condition is shown in FIG. 7. Such power grid events include for example, power interruptions, swells, sags, or where the frequency fluctuates outside of acceptable levels (for example by a few hertz in either direction). In this event, the switch 110 opens and 100% of the facility load is supplied by the on-site generators 104. As indicated above, the speed with which the facility islands in the event of a utility power disruption allows the system of the present invention to supply high quality, reliable power. In a preferred embodiment, the subcycle response of the switch 110 is between ¼ and ½ cycle. It is understood that the subcycle response may be lesser or greater than that in alternative embodiments.

Figure 8:
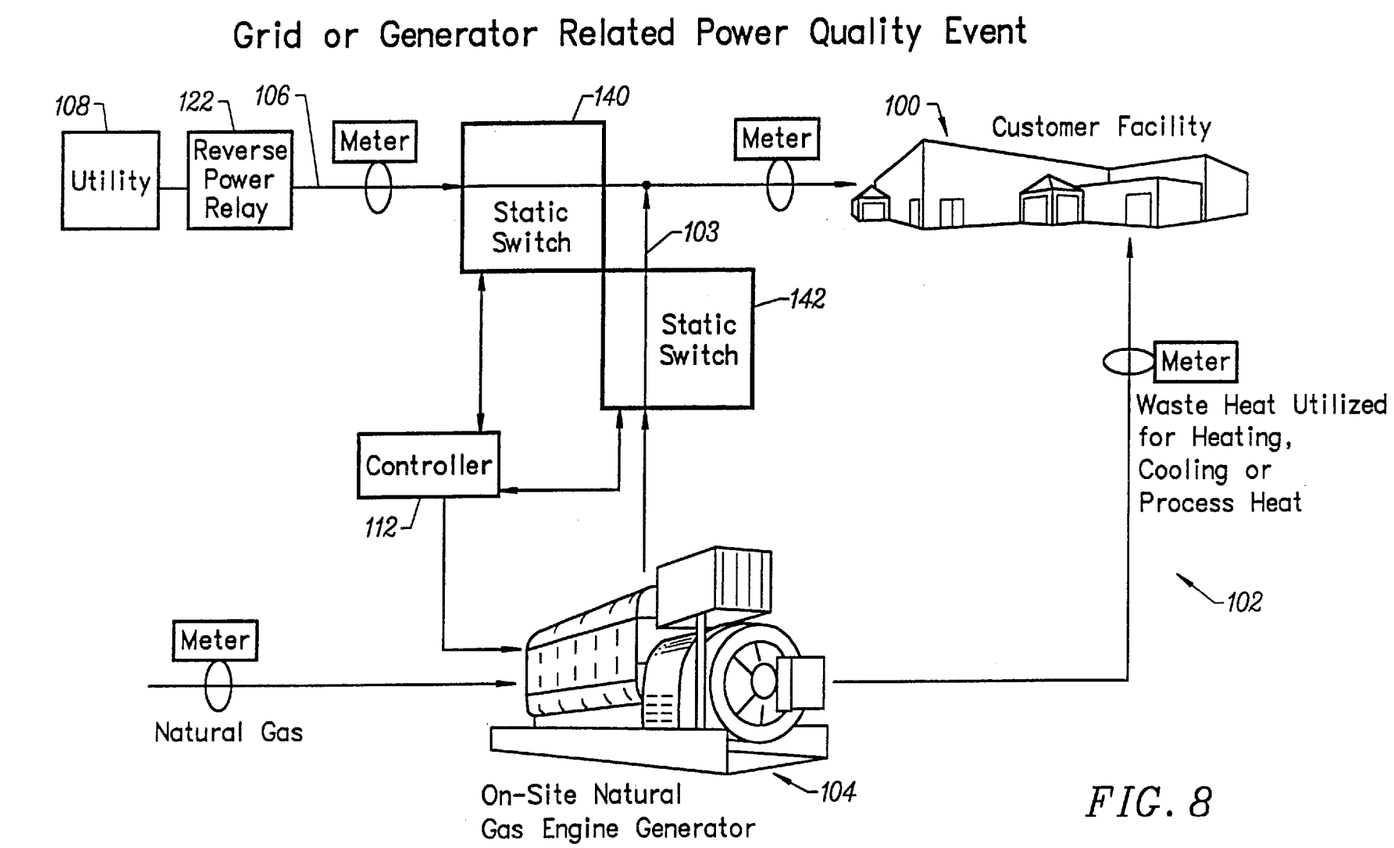
FIG. 8 is a graphic representation of an alternative embodiment of the power delivery system according to the present invention where both the utility and the generator bank are monitored for a power quality event.

In a preferred embodiment, the system monitors power quality only from the utility side. The generators will trip by their associated relays as a protective measure only in the event of a mechanical or electrical problem with the generators or their associated bus. However, in an alternative embodiment, it is contemplated that both the utility 108 and generators 104 are monitored for power quality and that each include a static switch which opens in the event of a power disruption or other power quality event. This embodiment is shown in FIG. 8. As shown therein, a static switch 140 may be located on bus 106, which switch opens in the event of a power quality event in the grid, and a static switch 142 may be located on bus 103, which switch opens in the event of a power quality event in the generators. In this embodiment, the switches collectively function as a static transfer switch to transfer power away from whichever power supply is not performing within the acceptable power ranges. Each of the switches 140 and 142 preferably responds to a sensed power quality event in less than a cycle to provide the response time advantages discussed above. In the unlikely event of a power disruption in both the grid and the generators, the controller 112 will prevent the switch 140 and/or switch 142 from opening to ensure that the facility 100 receives some level of power.

In addition to supplying power to the facility 100, the generators 104 generate waste heat which may also be utilized by facility 100 for heating, cooling or facility processes. The use of both power and heat from the generators is referred to as cogeneration. In conventional cogeneration systems, the amount of power and waste heat generated by the generator is dictated by the facility heat load. This is in contrast to the present invention, where the amount of power and waste heat generated by the generator is dictated by the facility electrical load. As the generators 104 are the primary source of power for facility 100, and are continuously running, a significant amount of heat energy is created for use by the facility according to the present invention.

The system according to the present invention is able to provide an uninterruptible power supply to a facility where high power quality is maintained by readily available backup power and speedy subcycle switching in the event of a grid related power quality event. Moreover, as the system operates without expensive short term power supplies, it is inexpensive to operate. The ease with which conventional power supply systems may be adapted to operate in accordance with the principals of the present invention is another attractive feature of the present invention. Moreover, the facility is not subject to restrictions or changes in power supply imposed by a utility. The power supply to the facility is controlled by the facility.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

We claim:

1. An uninterruptible power delivery system for supplying a power load of a facility within a high quality power range, the uninterruptible power delivery system comprising:
   a primary power supply from at least one generator located on-site to the facility; and
   a secondary power supply from a utility;
   wherein the at least one generator and the utility cooperate to provide to the facility a power load in a high quality power range;
   said high quality power range being power within a predetermined voltage range, a predetermined frequency range and not being interrupted for more than a cycle.

2. An uninterruptible power delivery system as recited in claim 1, wherein said at least one generator is capable of supplying 100% of the power load of the facility in the event said secondary power supply from said utility deviates outside of said high quality range.

3. An uninterruptible power delivery system as recited in claim 1, wherein the facility islands in the event said secondary power supply from said utility deviates outside of said high quality range.

4. An uninterruptible power delivery system as recited in claim 3, wherein said utility supplies power in a range large enough to prevent power flow to a grid supplied by the utility in the event of a drop in the power load of the facility, and small enough to allow said at least one generator to supply 100% of the facility load without tripping upon said islanding of said facility.

5. An uninterruptible power delivery system as recited in claim 1, further including a switch capable of islanding the facility in less than a cycle in the event said secondary power supply from said utility deviates outside of said high quality range.

6. An uninterruptible power delivery system as recited in claim 1, wherein said at least one generator supplies between 80% and 98% of the power load of the facility and said utility supplies between 20% and 2% of the power load of the facility during normal operation.

7. An uninterruptible power delivery system as recited in claim 6, wherein said utility is capable of supplying more than 20% of the power load of the facility in the event that one or more of said at least one generator is off-line.

8. An uninterruptible power delivery system as recited in claim 6, wherein said utility is capable of supplying 100% of the power load of the facility in the event that one or more of said at least one generator is off-line.

9. An uninterruptible power delivery system as recited in claim 1, wherein the facility load is y kilowatts, and the single largest load in the facility is x kilowatts, said at least one generator supplying $((y-x)/y) \times (100\%)$ of the power load of the facility and said utility supplies $(x/y) \times (100\%)$ of the power load of the facility during normal operation of the power delivery system.

10. An uninterruptible power delivery system as recited in claim 9, wherein said at least one generator supplies y kilowatts in the event power from said utility drops outside of said high quality range.

11. An uninterruptible power delivery system as recited in claim 9, wherein said utility supplies y kilowatts in the event power from said at least one generator drops outside of said high quality range.

12. An uninterruptible power delivery system as recited in claim 1, further comprising a controller for controlling the operation of the power delivery system.

13. An uninterruptible power delivery system as recited in claim 1, wherein said at least one generator generates waste heat in addition to power, said waste heat being supplied to the facility for use by the facility.

14. An uninterruptible power delivery system as recited in claim 1, wherein the power delivery system does not include a short term stored power supply.

15. An uninterruptible power delivery system for supplying a power load of a facility within a high quality range, the uninterruptible power delivery system comprising:
   a primary power supply from at least one generator located on-site to the facility;
   a secondary power supply from a utility; and
   a static disconnect switch for isolating the facility from the power supply from said utility in less than a cycle in the event power to the facility from the utility is outside of a high quality range of power wherein said high quality range is power within a predetermined voltage range, a predetermined frequency range and not being interrupted for more than a predetermined length of time.

16. An uninterruptible power delivery system as recited in claim 15, wherein said at least one generator is capable of supplying 100% of the power load of the facility in the event said secondary power supply from said utility deviates outside of said high quality range.

17. An uninterruptible power delivery system as recited in claim 15, wherein the facility islands in the event said secondary power supply from said utility deviates outside of said high quality range.

18. An uninterruptible power delivery system as recited in claim 17, wherein said utility supplies power in a range large enough to prevent power flow to a grid supplied by the utility in the event of a drop in the power load of the facility, and small enough to allow said at least one generator to supply 100% of the facility load without tripping upon said islanding of said facility.

19. An uninterruptible power delivery system as recited in claim 15, wherein said at least one generator supplies between 80% and 98% of the power load of the facility and said utility supplies between 20% and 2% of the power load of the facility during normal operation.

20. An uninterruptible power delivery system as recited in claim 19, wherein said utility is capable of supplying more than 20% of the power load of the facility in the event that one or more of said at least one generator is off-line.

21. An uninterruptible power delivery system as recited in claim 15, wherein the facility load is y kilowatts, and the single largest load in the facility is x kilowatts, said at least one generator supplying ((y−x)/y)×(100%) of the power load of the facility and said utility supplies (x/y)×(100%) of the power load of the facility during normal operation of the power delivery system.

22. An uninterruptible power delivery system as recited in claim 21, wherein said at least one generator supplies y kilowatts in the event power from said utility drops outside of said high quality range.

23. An uninterruptible power delivery system as recited in claim 21, wherein said utility supplies y kilowatts in the event power from said at least one generator drops outside of said high quality range.

24. An uninterruptible power delivery system as recited in claim 15, further comprising a controller for controlling the operation of the power delivery system.

25. An uninterruptible power delivery system as recited in claim 15, wherein said at least one generator generates waste heat in addition to power, said waste heat being supplied to the facility for use by the facility.

26. An uninterruptible power delivery system as recited in claim 15, wherein the power delivery system does not include a short term stored power supply.

27. An uninterruptible power supply system for supplying an alternating current power load to a facility, the system comprising:
    at least one generator located on-site to the facility, the at least one generator providing a primary power supply to the facility;
    a utility power supply which may provide a secondary power supply to the facility; and
    a switch interposed between the utility power supply and the facility, the switch being capable of opening within one cycle of the alternating current to electrically isolate the facility from the utility power supply;
    wherein under normal operating conditions the at least one generator supplies the primary power load to the facility and the utility power supply may supply a secondary power load to the facility to supplement the primary power load from the at least one generator and when the secondary power load from the utility power supply falls outside a high quality power range of at least one of a predetermined range of voltage and of a predetermined range of frequency, for more than a predetermined length of time, the switch opens within one cycle to electrically isolate the facility from the utility power supply.

28. An uninterruptible power supply system as recited in claim 27 wherein the predetermined length of time is less than a cycle.

29. An uninterruptible power supply system as recited in claim 28 wherein the switch may open in between ¼–½ of a cycle.

30. An uninterruptible power supply as recited in claim 28 wherein the utility power supply supplies at least 2% of the power load to the facility under normal operating conditions.

31. An uninterruptible power supply system for supplying an alternating current power load to a facility, the system comprising:
    at least one generator located on-site to the facility, the at least one generator providing a primary power load to the facility; and
    a utility power supply which may provide a secondary power load to the facility to supplement the primary power load;
    wherein the at least one generator cooperates with the utility power supply to provide a power load to the facility which is of a high quality of power in at least one of a predetermined range of voltage and of a predetermined range of frequency, and not being interrupted for more than a predetermined period of time, without requiring a tertiary stored energy supply to provide a substantial portion of the power load to the facility.

32. An uninterruptible power supply system as recited in claim 31 wherein the predetermined length of time is one cycle.

33. A method of providing uninterruptible power to a facility, the method comprising:
    connecting at least one generator to a facility to provide a primary power load to the facility;
    connecting a utility power supply to the facility to provide a secondary primary load to the facility;
    monitoring the quality of the power load provided by the utility power supply to the facility; and
    electrically isolating the facility from the utility power supply whenever the quality of the power load falls outside a high quality power range, said high quality power range being power within in a predetermined voltage range, a predetermined frequency range and not being interrupted for more than a predetermined length of time.

34. The method of claim 33 wherein the predetermined length of time is one cycle.

35. The method of claim 33 wherein the utility provides a secondary power load of at least 2% of the overall facility load to supplement the primary power load during the normal operation of power delivery to the facility.

36. The method of claim 33 wherein a static disconnect switch is connected between the utility power supply and the facility to electrically isolate the facility from the utility power supply when the power load falls outside the high quality power range.

37. The method of claim 33 wherein the at least one generator provides a sufficiently high power load to the facility that in the event the facility electrically isolates from the utility power supply, at least one generator can keep the facility powered within the high quality power range without the need of a tertiary stored power device to deliver a significant portion of the power load.

38. The method of claim 33 wherein the facility has a load requirement of at least one megawatt under normal operating conditions.

* * * * *